(12) United States Patent
Corrion

(10) Patent No.: US 7,539,334 B2
(45) Date of Patent: May 26, 2009

(54) METHOD AND APPARATUS FOR IDENTIFYING MOLE GROWTH

(75) Inventor: Bradley W. Corrion, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 11/220,635

(22) Filed: Sep. 6, 2005

(65) Prior Publication Data

US 2007/0053559 A1 Mar. 8, 2007

(51) Int. Cl.
*G06K 9/00* (2006.01)
(52) U.S. Cl. ........................... 382/128; 382/130
(58) Field of Classification Search ......... 382/128–134, 382/112; 128/922–925; 250/455.11; 356/39; 377/10; 700/57; 358/473; 424/646
See application file for complete search history.

(56) References Cited

U.S. PATENT DOCUMENTS

| | | | | |
|---|---|---|---|---|
| 6,125,893 | A * | 10/2000 | Braatz et al. | 141/18 |
| 6,427,022 | B1 * | 7/2002 | Craine et al. | 382/128 |
| 7,162,063 | B1 * | 1/2007 | Craine et al. | 382/128 |
| 7,415,143 | B2 * | 8/2008 | Grichnik | 382/128 |
| 2004/0028263 | A1 * | 2/2004 | Sakamoto | 382/128 |
| 2006/0072798 | A1 * | 4/2006 | Allen et al. | 382/128 |
| 2006/0210132 | A1 * | 9/2006 | Christiansen et al. | 382/128 |

OTHER PUBLICATIONS

Skin Detail Analysis for Face Recognition; Pierrard Jean-Sebastien, Thomas,Vetter; University of Basel, Department of Computer Science Bernoullistasse 16, CH-4056 Basel, Switzerland IEEE 2000, 1-4244-1180-7/07.*
Performance of AI Methods In Detecting Melanoma; Arve Kjoelen, Marc I. Thompson, Scott E. Umbaugh, Dept. of Elect. Engin., S. III. University; Randy H. Moss, Depart. of Electrical Engineering, University of Mo.; William V. Stoeker, Dept. Comp. Science, University of Mo. IEEE Engineering in Medicine and Biology 07395175/95 Jul./Aug. 1995.*

(Continued)

*Primary Examiner*—Samir A. Ahmed
*Assistant Examiner*—Mehdi Rashidian
(74) *Attorney, Agent, or Firm*—D'Ann Naylor Rifai

(57) ABSTRACT

A mole analysis program generates a digital signature for a first mole, based on a digital image of first, second, and third moles. The program may then determine whether the first mole matches a previously imaged mole, based on the digital signature for the first mole and baseline data with baseline signatures for previously imaged moles. In response to determining that the first mole matches a previously imaged mole, the program may automatically determine whether the first mole has changed. In various embodiments, the digital signature may include angle entries for the digital signature and/or distance entries for the first signature. An angle entry may represent an angle between two lines to connect the first mole with the second mole and the third mole. A distance entry may correspond to the distance between the first mole and the second mole. Other embodiments are described and claimed.

22 Claims, 4 Drawing Sheets

OTHER PUBLICATIONS

A Reliable Skin Mole Localization Scheme; Taeg Sang Cho, William T Freeman; CSAIL Dept. of Electrical Engineering and Computer Science; Massachusetts Institute of Technology; Hensin Tsao; Dept of Dermatology; Harvard Medical School; Wellman Center for Photomedicine; IEEE 20007, 978-1-4244-163-8/07.* http://www.cmis.csiro.au/iap/RecentProjects/melanoma.htm (CMIS Research—Image Analysis Activities).

http://www.dermalscreen.com/AboutDSC.html (Dermal Screening Centers, Inc (DSC).

http://www.bcbsnc.com/services/medical-policy/pdf/whole_body_integumentary_photography_dermatoscopy.pdf (Corporate Medical Policy Whole Body Integumentary Photography).

http://www.opticomadataresearch.com/molesense.htm (Opticom Data Research—MoleSense).

* cited by examiner

METHOD AND APPARATUS FOR IDENTIFYING MOLE GROWTH

FIELD OF THE INVENTION

The present disclosure relates generally to the field of data processing, and more particularly to automated methods and related apparatus for identifying mole growth.

BACKGROUND

In general, skin cancer is more likely to be curable when the cancer is identified and treated early. Recognition of abnormal growth and changes to moles is one way to identify, at an early stage, moles with an increased risk of becoming cancerous.

Specifically, the American Academy of Dermatology (the AAD) states some moles may develop into a form of skin cancer known as malignant melanoma (www.aad.org/public/Publications/pamphlets/Moles.htm). On that web page, the AAD provides additional guidance, as follows:

Recognizing the early warning signs of malignant melanoma is important. Remember the ABCD's of melanoma when examining your moles.

A stands for ASYMMETRY, when one half of the mole doesn't match the other half.

B stands for BORDER, when the border or edges of the mole are ragged, blurred or irregular.

C stands for COLOR, when the color of the mole is not the same throughout or if it has shades of tan, brown, black, red, white or blue.

D stands for DIAMETER, when the diameter of a mole is larger than 6 mm, about the size of a pencil eraser.

If a mole displays any of these signs, it should be checked promptly by a dermatologist.

Another factor that may point to an increased risk of cancer is a significant change in any of the above attributes over time. Heretofore, tracking the changes to moles over time has been a laborious process.

For instance, a specially trained photographer may take a predetermined number (e.g., 36) of digital photographs of a subject, carefully capturing each image from a predetermined distance, a predetermined perspective or angle, and with a predetermined camera rotation, relative to the subject. Collectively, the images may record a full-body image of the subject. The original set of images may be saved. At a later time, the specially trained photographer may take another full set of images using the same, careful procedure. Computer software may be used to store the images and to retrieve the images, to help a medical professional to manually compare before and after images to detect changes over time.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
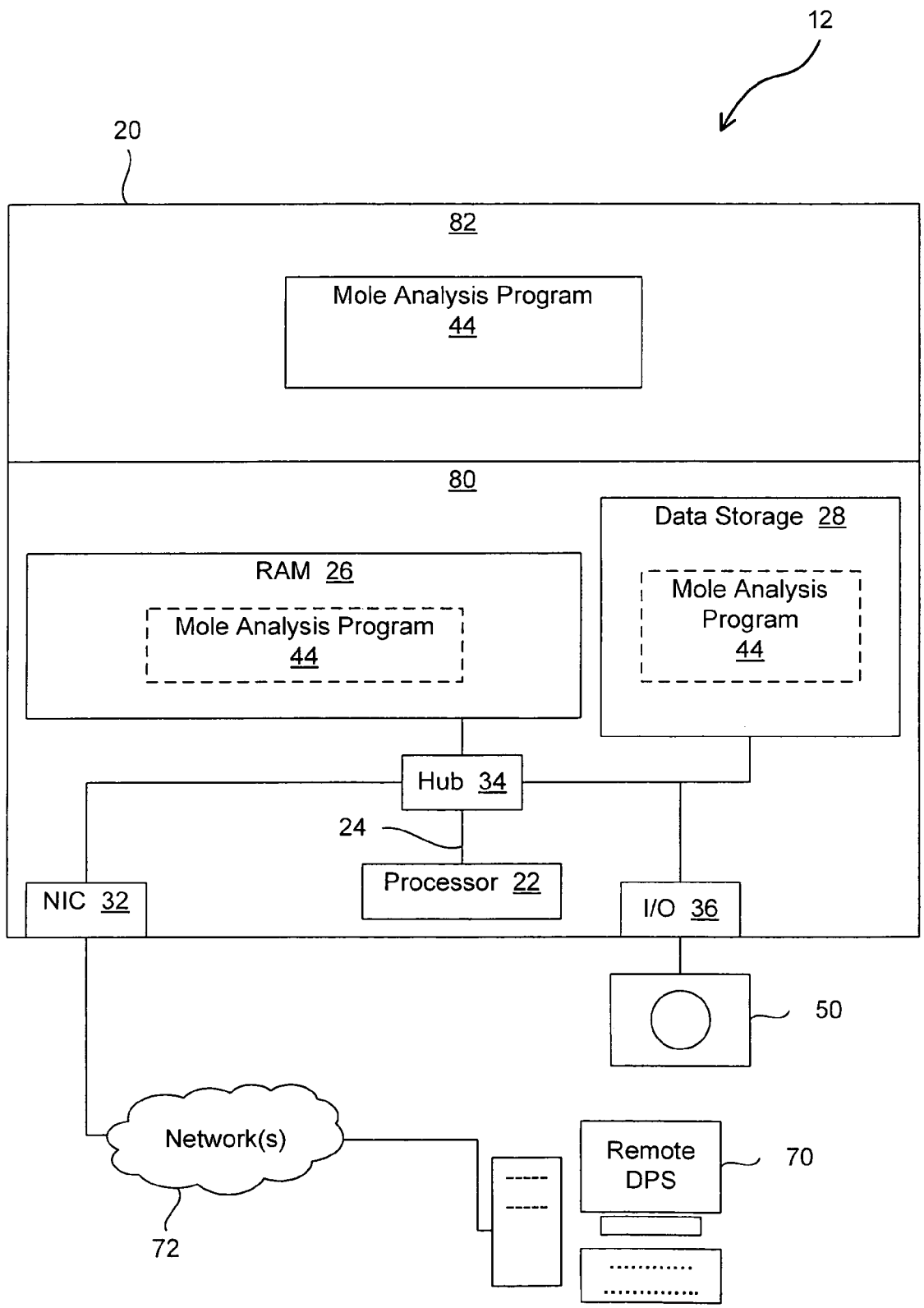
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or central processing units (CPUs) 22 communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 20, processor 22 may be communicatively coupled to one or more volatile or non-volatile data storage devices, such as random access memory (RAM) 26, read-only memory (ROM), mass storage devices 28 such as integrated drive electronics (IDE) or small computer system interface (SCSI) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, input devices such as a camera 50, a keyboard, a mouse, etc. Processing system 20 may also include one or more bridges or hubs 34, such as a memory controller hub, an input/output (I/O) controller hub, a PCI root bridge, etc., for communicatively coupling system components. As used herein, the term "bus" includes pathways that may be shared by more than two devices, as well as point-to-point pathways.

Some components, such as NIC 43, for example, may be implemented as adapter cards with interfaces (e.g., a PCI connector) for communicating with a bus. Some devices may be implemented as embedded controllers, using components such as programmable or non-programmable logic devices or arrays, application-specific integrated circuits (ASICs), embedded computers, smart cards, and the like.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage.

For instance, data storage device 28 may include various sets of instructions which, when loaded into RAM 26 and executed, perform various operations. The sets of instructions may be referred to in general as applications, modules, drivers, etc. For purposes of this disclosure, the term "program" is used in general to cover a broad range of software constructs, including applications, modules, drivers, subprograms, and other types of software components.

As illustrated in FIG. 1, in the example embodiment, the programs or software components 82 may include a mole analysis program 44. As described in greater detail below, mole analysis program 44 may enable processing system 20 to automatically identify new moles as well as mole changes, such as growth of existing moles. In one relatively inexpensive implementation, designed for use at home by consumers who may not have any medical or technical training, processing system 20 is a PC, and camera 50 is a simple, inexpensive, digital camera, a webcam, or any other suitable imaging device.

In the example embodiment, mole analysis program 44 analyzes digital images and identifies moles based on their neighboring moles. In addition, mole analysis program 44 can correlate the moles in one image to the moles in a previous image, even if the two images were captured from different distances, from different angles, and with the camera at a different rotation, relative to the body part being imaged. Once a mole has been identified and matched to the previous image, the characteristics of the mole at the different points in time can be compared manually or automatically. If an automatic comparison is used, processing system 20 may generate output to highlight the moles with significant changes for the user/subject. If any moles with significant changes are found, the subject may then visit a medical professional for further evaluation.

Figure 2:
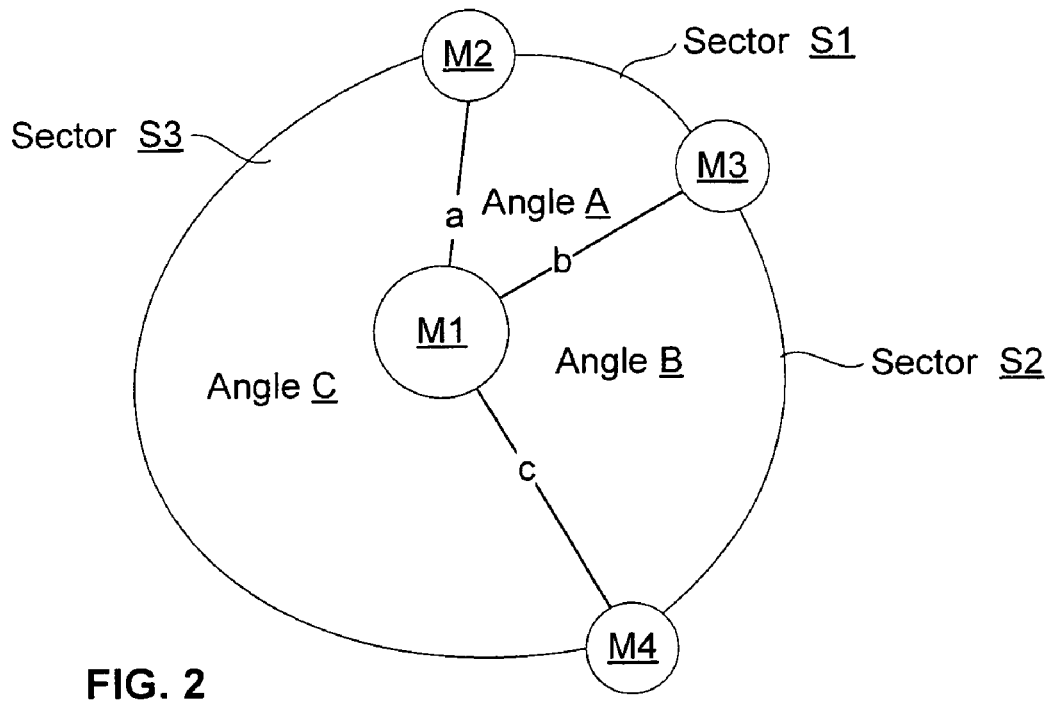
FIGS. 2 and 3 are schematic diagrams that represent an image of skin that has moles, and that also depict various measurements associated with an example embodiment of the present invention.
Figure 3:
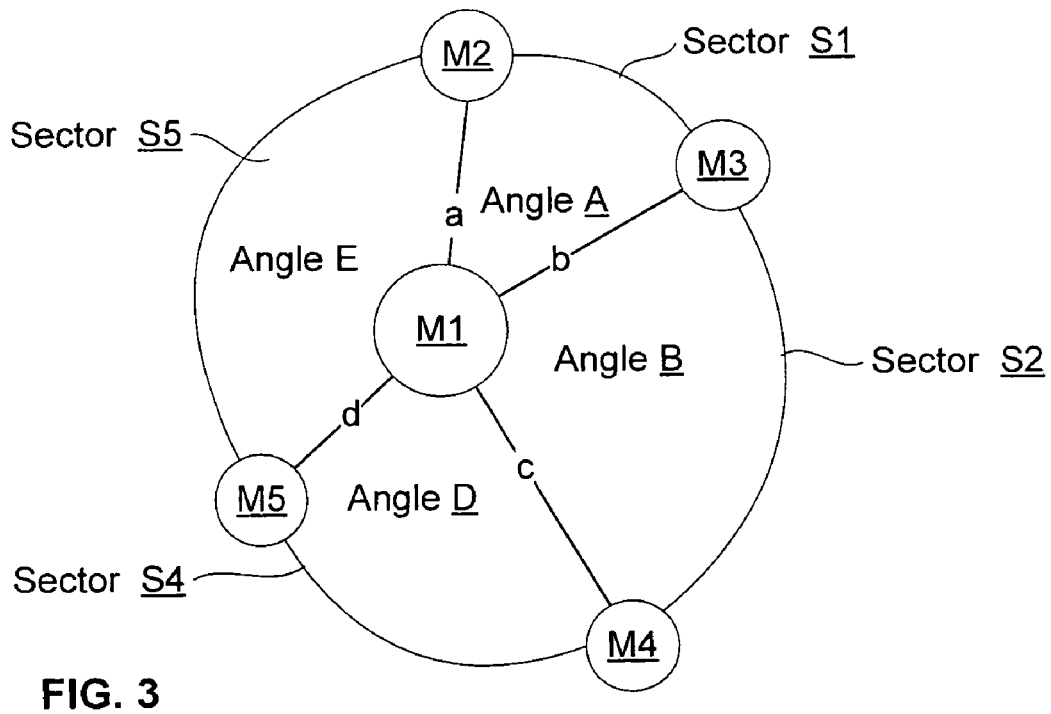

FIGS. 2 and 3 are schematic diagrams that represent an image of skin that has moles. FIGS. 2 and 3 also depict various measurements associated with an example embodiment of the present invention. Specifically, FIG. 2 depicts an image containing four moles: M1-M4. As described in greater detail below, mole analysis program 44 will compare data derived from the image of FIG. 2 with data derived from a subsequent image (i.e., FIG. 3) in the process of mole analysis.

For purposes of illustration, this disclosure treats the image of FIG. 2 as a baseline image, while the image of FIG. 3 serves at times as a present image, and at other times as a baseline image. Typically, the term "baseline image" denotes an image that has been previously captured and/or analyzed, while the term "present image" denotes an image taken at a later point in time, relative to one or more baseline images. For instance, as described in greater detail below, mole analysis program 44 may compare a present image and a baseline image to detect changes over time.

Figure 4:
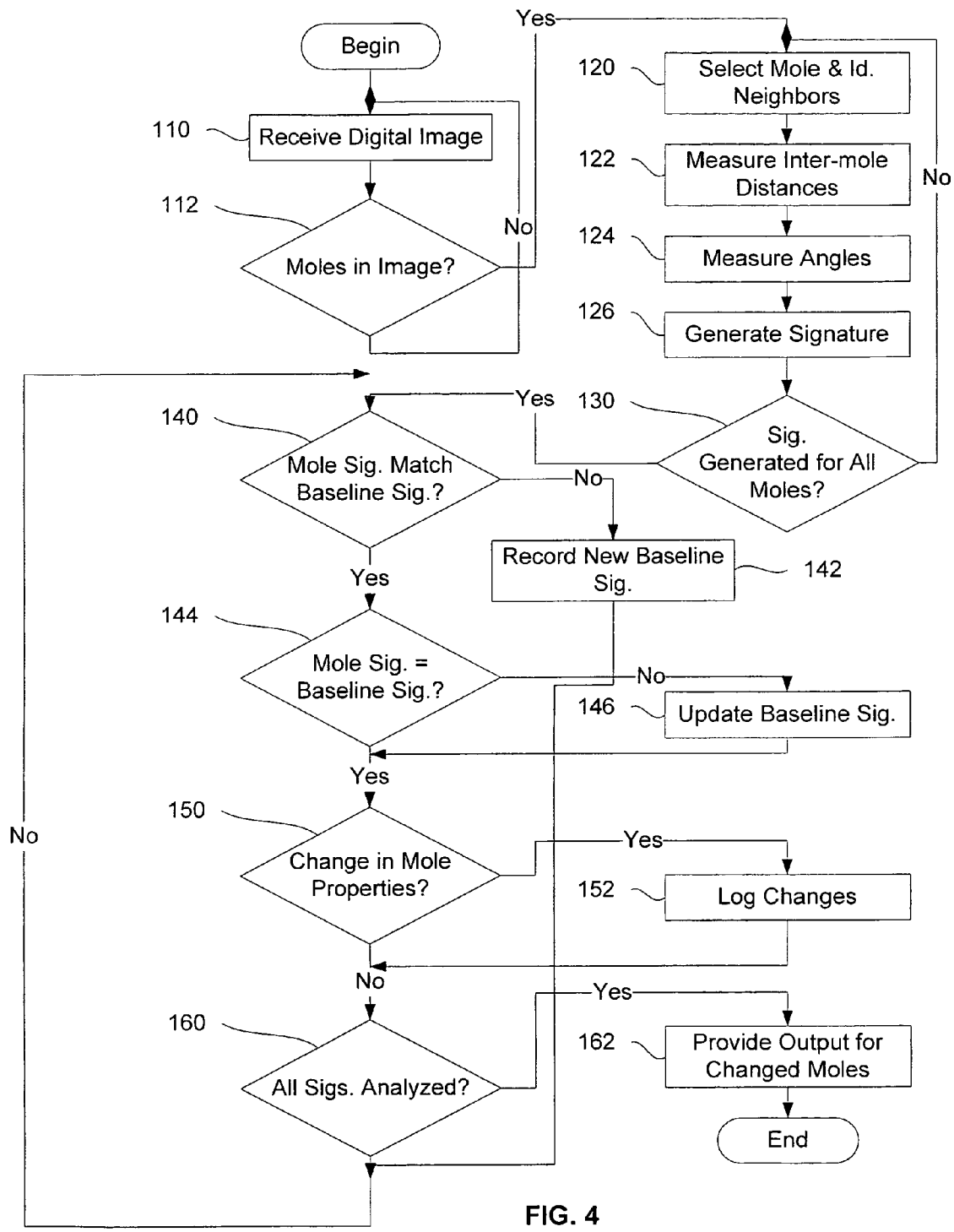
FIG. 4 presents a flowchart of an example embodiment of a method for identifying mole growth.

FIG. 4 presents a flowchart of an example embodiment of a method for identifying mole growth. The illustrated process begins with mole analysis program 44 executing in processing system 20. As indicated at block 110, mole analysis program 44 may receive a digital image to be analyzed. For instance, the image may be received directly from camera 50, or indirectly, such as in a machine-accessible medium that contains images captured by camera 50 of any other suitable imaging device. At block 112, mole analysis program 44 automatically determines whether the received image contains any moles. Mole analysis program 44 may use any suitable techniques, thresholds, etc, when automatically determining whether an image contains moles. Mole analysis program 44 may also automatically assign an identifier ((e.g., M1, M2, etc.) to each mole that mole analysis program 44 detects within the image.

Alternatively, for a baseline image such as that depicted in FIG. 2, mole analysis program 44 may receive user input that indicates whether the image contains moles, that specifies where in the image the moles are located, that assigns identifiers to the moles, etc.

In the example embodiment, if the image does not contain at least a predetermined number of moles (e.g., two moles), mole analysis program 44 may produce output to indicate that the image does not contain enough moles to allow mole signatures to be generated, and the process may then end or return to block 110 to receive the next image to be processed.

If the image contains at least the predetermined minimum number of moles, mole analysis program 44 may then begin automatically generating signatures for the moles in the image by selecting a target mole and determining which of the other moles in the image are neighbors to the target mole, as depicted at block 120. Mole analysis program 44 may use any suitable technique to determine which moles should be classified as neighbors of the target mole. For instance, mole analysis program 44 may (a) select one of the moles to serve as the center mole, (b) measure the distance between the center mole its nearest mole, (c) multiply that distance by a predetermined factor (e.g., a factor of two) to derive a neighbor distance, and (d) treat all moles within the neighbor distance from the center mole as neighbors to the center mole. A technique such as this is flexible and adjusts to the density of nearby moles. Alternatively, mole analysis program 44 may extend the previous example by adding multiples of the initial radius until a predetermined number of moles are in the neighborhood. This alternative technique may provide for more effective identifications.

As indicated at block 122, mole analysis program 44 may then measure the distance in the image from the target mole to each neighbor mole. The pixel-weighted center of each mole may be used for the measurements.

For example, referring again to FIG. 2, mole analysis program 44 may, in effect, measure the lengths of lines a, b, and c. Also, as depicted at block 124, for each pair of adjacent neighbor moles, mole analysis program 44 may measure the angle between the lines that connect each of those moles to the target mole. For instance, with regard to FIG. 2, mole analysis program 44 may compute Angle A as the angle between lines a and b, Angle B as the angle between lines b and c, and Angle C as the angle between lines c and a.

If arcs were to be added to connect each neighbor mole with its adjacent neighbor moles, those arcs and the lines referenced above would create shapes referred to herein as sectors. For example, when analyzing the image depicted in FIG. 2, mole analysis program 44 may create and assign identifiers for two wedge-shaped sectors (S1 and S2) and a third sector (S3).

As indicated at block 126, in the example embodiment, after measuring the distances and angles referenced above, mole analysis program 44 generates a signature for the target mole. The signature may allow the target mole to be correlated between different images, even if those images are captured using a different distance, a different angle, and a different rotation of the camera, relative to the body part being imaged.

In the example embodiment, the signature that mole analysis program 44 generates for mole M1 include entries or records which describe the position of mole M1, relative to its neighboring moles. As described in greater detail below, that position may be described in terms of distances, ratios of distances, angles, ratios of angles, or any suitable combination of those or other attributes.

For instance, signature entries pertaining to distance may include ratios of distances between the target mole and each neighboring mole. Each such distance entry may also include the unique identifier of the relevant neighbor mole. For each distance entry, mole analysis program 44 may use a function such as minimum (MIN), maximum (MAX), or any other suitable function to determine a uniform denominator (or numerator) for all of the distances in the signature. Thus, mole analysis program 44 may create a signature of Mole M1 by measuring the normalized distance to neighboring moles in an unordered list of tuples such as the following:

Signature for Mole M1:
 Mole M2, a/(min (a,b,c)
 Mole M3, b/(min (a,b,c)
 Mole M4, c/(min (a,b,c)

In FIG. 2, line a is the shortest and line c is the longest. Consequently, the length of line 1 would form the denominator in each of the above entries. The numerator for each entry would be the length of the line between the target mole and the identified neighbor mole.

The signature may also include a rotation entry indicating which mole is to be treated as 0 degrees or "twelve o'clock" (i.e., which neighbor mole is to serve as the rotation origin or primary rotation reference point). Rotation entries may help mole analysis program 44 to perform border comparisons for images of a mole taken at different times. Rotation entries may also be referred to as rotation reference entries or primary rotation reference entries, and they may take the following form, for example:

Signature for Mole M1:
 0 degrees=Mole M2

In addition or alternatively, mole analysis program 44 may include entries in the signature pertaining the inter-mole angles. For example, mole analysis program 44 may create angle entries as an unordered list of tuples such as the following:

Signature for Mole M1:
 Sector S1=(Angle A, a/b)
 Sector S2=(Angle B, b/c)
 Sector S3=(Angle C, c/a)

As indicated above, each angle entry may also include distance data, possibly computed as a ratio. In the example embodiment, mole analysis program 44 uses a value or expression known as a sector ratio as the distance data. The sector ratio may be defined, for example, as the length of the first line (e.g., line a) over the length of the second line (e.g., line b), where the first and second lines are determined based on a predetermined rotation direction (e.g., a clockwise direction) from one neighbor mole to the next.

Any other suitable data points may be used to create additional or alternative signature entries or portions of signature entries. For instance, the signature may include an entry representing the size of the mole (e.g., the maximum diameter), relative to the other distances in the image.

Referring again to FIG. 4, as shown at block 130, after generating the signature for the target mole, mole analysis program 44 may determine whether it has generated signatures for each of the moles in the image. If signatures have not been generated for each of the moles, the process may return to block 120, with mole analysis program 44 selecting another mole as the target mole, and performing additional operations, as described above, until mole analysis program 44 has generated signatures for all of the moles in the image.

After all of the signatures have been generated, the process may proceed from block 130 to block 140, with mole analysis program 44 selecting a mole signature for purposes of matching that signature against baseline data. As described in greater detail below, once a mole (e.g., mole M1) has been successfully identified (i.e., correlated or matched between the present image and a baseline image), changes in the mole's size, shape, border, and color can be identified.

However, if processing system 20 does not yet contain baseline data for the subject, the process flows from block 140 to block 142, with mole analysis program 44 storing the current signature as a baseline signature. The process may then return to block 140, with mole analysis program 44 selecting a different signature to be matched against baseline data.

Mole analysis program 44 may use any suitable threshold or combination of thresholds to determine whether the presently selected mole signature matches a baseline signature. For example, mole analysis program 44 may be configured to determine that signatures match if at least 66% (or some other predetermined percentage) of the distance entries, angle entries, or both, agree. For example, mole analysis program 44 may be configured to determine that the present signature matches a baseline signature if at least two out of three angle entries for those signatures agree.

Similarly, mole analysis program 44 may be configured to conclude that signature entries agree if those entries differ by no more than a predetermined agreement threshold (e.g., 80%). For example, a present distance entry with a value of one over two (alternatively expressed as ½ or 0.5) may agree with a baseline distance entry if the baseline distance entry is within 80% of 0.5. The agreement threshold may also be referred to as a measurement difference threshold.

In addition, the agreement threshold may be dynamically modified, based on the number of false matches or failed matches that are made. Also, the importance of the agreement threshold itself may drop as more moles are identified. Previous baseline signatures may be used in combination to identify the remaining moles with higher confidence. Detecting an overlap between signatures to identify common neighbors may increase the confidence of properly identifying the remaining known moles, as well as new moles. This approach may be analogous to how a distant relative gains confidence with matching children's names to the children at a family gathering. As the names are matched with children, and the pool of unmatched names shrinks, and the remaining children may be matched to names more quickly and easily—"... and this must be Jane; my have you grown!"

Referring again to block 140, when a new mole appears in an image, the signature for the new mole is unlikely to match any baseline signatures. Consequently, mole analysis program 44 may automatically record baseline signature for new moles, as indicated at block 142.

When mole analysis program 44 determines that the present signature matches a baseline signature, mole analysis program 44 may then determine whether the present signature and the baseline signature are substantially equal. Two signatures may be considered substantially equal if all of the entries in one signature have corresponding entries in the other signature, and the differences, if any, in the values of the corresponding entries is no greater than the applicable measurement difference threshold.

If mole analysis program 44 determines that the signatures are not substantially equal, mole analysis program 44 updates the baseline signature for that mole with the new signature. Thus, when a new mole appears, mole analysis program 44 will update the signatures for all related moles accordingly when mole analysis program 44 analyzes those related moles. Mole analysis program 44 may also keep archive copies of old baseline signatures, for reference.

FIG. 3 represents an image of skin that corresponds to the image from FIG. 2, but taken at a later time, after the appearance of a new mole M5. Accordingly, in the discussion of FIG. 4 below, FIG. 2 is considered the baseline image, and FIG. 3 is considered the present image. As indicated above, the baseline signature for mole M1 may have the following entries:

Baseline Signature for Mole M1:
   Mole M2, a/(min (a,b,c)
   Mole M3, b/(min (a,b,c)
   Mole M4, c/(min (a,b,c)
   0 degrees==Mole M2
   Sector S1==(Angle A, a/b)
   Sector S2==(Angle B, b/c)
   Sector S3==(Angle C, c/a)

By contrast, the signature generated by mole analysis program 44 for mole M1 based on the present image may have the following entries:

Present Signature for Mole M1:
   Mole M2, a/(min (a,b,c,d)
   Mole M3, b/(min (a,b,c,d)
   Mole M4, c/(min (a,b,c,d)
   Mole M5, d/(min (a,b,c,d)
   0 degrees==Mole M2
   Sector S1==(Angle A, a/b)
   Sector S2==(Angle B, b/c)
   Sector S4==(Angle D, c/d)
   Sector S5==(Angle E, d/a)

Consequently, when mole analysis program 44 processes the present signature for mole M1, t the process of FIG. 4 will flow through blocks 140 and 144 to block 146, and mole analysis program 44 may replace the baseline signature for mole M1 with the present signature for mole M1.

Further, as indicated above, once named moles are identified the confidence increases in identifying neighboring moles in the photograph. In addition, mole analysis program 44 may dynamically recreate the signatures of baseline moles to compare to the most current neighborhood by using a different multiple for the "multiples of a radius" definition of a neighborhood described above. Recreating signatures to capture more moles per neighborhood may be particularly helpful when analyzing neighborhoods with fewer moles, since the difference threshold may be more sensitive for signatures with fewer entries. For example, an 80% match for five moles is four out of five, whereas an 80% match for ten moles its eight out of ten. The 80% match at ten moles may be a stronger value, as the signature uniqueness may grow as the sample grows. An analogy is to compare the odds of falsely matching five moles making the four points of compass, versus nine moles making up the big dipper.

After determining that the present signature matches a baseline signature and possible updating the baseline signature, mole analysis program 44 may compare the baseline properties of the mole with the present properties of the mole. If mole analysis program 44 detects significant changes in the properties of the mole, mole analysis program 44 may record the changes in a log file, as indicated at block 152.

In an alternative embodiment, mole analysis program 44 may automatically match or correlate moles from the present image to moles in a baseline image, and then the user can manually identify which moles have changed. In one embodiment, manual interaction of the user with mole analysis program 44 would entail the user selecting a mole, and then being presented with various views of that mole over time. Ideally the time would be scaled appropriately in these views.

For instance, mole analysis program 44 may present a series of vertical lines representing the largest diameter of the mole at the time of each baseline image. The progression of lines from left to right would allow the user to make his or her own judgment regarding the rate of change in size.

As another option, mole analysis program 44 may present a series of images, like a child's animation flip book, which repeatedly cycles through images of the mole (from oldest to newest), allowing the user to see the progression of changes in the mole. Preferably, the images would be scaled for uniformity.

In another option, mole analysis program 44 performs a first pass analysis of mole changes (e.g., evaluating the ABCD factors referenced above), and uses a green-yellow-red coloring to highlight suspected mole changes (danger). If the user confirms a yellow or red mole change, mole analysis program 44 prepares a print out of the relative area including before, after, and "delta" photos.

Mole analysis program 44 may also allow the user to "drag" the moles onto a visual representation of the body to associate the mole to a region. Similarly, the user could correct a false match by dragging the mole over a baseline image and dropping it onto the correct mole.

The user may print a summary report for taking to the doctor which highlights the location of the moles on a diagram of the body, with expanded views or "popups" showing an enlarged photo of each mole under scrutiny.

Also, the user can manually assign the scrutiny or danger level of a mole, to track a suspicious mole that the software doesn't recognize. This assignment would be used in the other reports mentioned herein.

Figure 5:
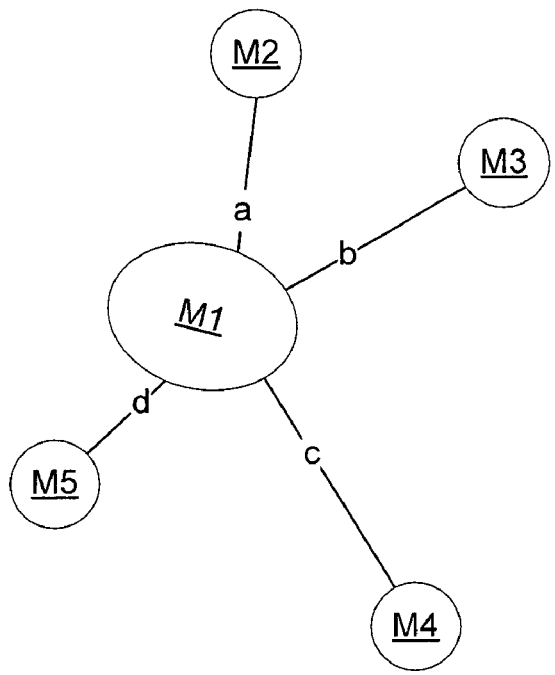
FIG. 5 is a schematic diagram that represents an image captured after one of the moles of FIG. 3 has changed, and that also depicts various measurements associated with an example embodiment of the present invention.

FIG. 5 is a schematic diagram that represents a digital image captured after one of the moles of FIG. 3 has changed, and that also depicts various measurements associated with an example embodiment of the present invention. As illustrated, the image of FIG. 5 includes moles M1-M5. Since the image of FIG. 5 was captured after the image of FIG. 3, FIG. 3 constitutes a baseline image relative to FIG. 5, and FIG. 5 constitutes the present image. When analyzing the digital image depicted in FIG. 5, mole analysis program 44 may determine that mole M1 in FIG. 5 matches mole M1 in the baseline data, according to the process described above with regard to FIG. 4. At block 150 of FIG. 4, mole analysis program 44 may compare attributes stored in the in the present signature with attributes stored in the previous signature (e.g., the baseline signature) to determine whether the target mole has changed.

For example, as indicated above, each signature may include an entry describing the size of the mole. For instance, the size entry may describe the maximum diameter of the mole (i.e., the distance across the mole at its two furthest points). Mole analysis program 44 may compare the size entry in the present signature to the size entry in the baseline signature to determine whether a mole has grown or shrunk. Similarly, each signature may include entries describing other attributes of the mole, such as the calculated image scale, the region of body (if supplied by user, such as arm, upper back, left leg, etc.). The signature may also contain the 2, 4, 8, 16 radii at regular intervals from 12 o'clock.

These radii can be used to quickly identify changes in the ABD factors referenced above. As indicated above, these values may be recalculated from old images. Alternatively, data pertaining to one or more attributes of one or more moles may be stored in some other data structure, independent of the signatures.

In one embodiment, mole analysis program 44 includes data describing the outline of each mole in that mole's signature. Further, as indicated above, each signature may include a rotation reference point. Mole analysis program 44 may compare the data pertaining to the image of FIG. 5 with the data for the image of FIG. 3 to determine that the outline of mole M1 has changed. As indicated at block 152 of FIG. 4, mole analysis program 44 may log all significant changes.

As shown at block 160, mole analysis program 44 may then determine whether the signatures for each of the moles in the present image have been analyzed. If all signatures have not yet been analyzed, the process may return to block 140, with mole analysis program 44 selecting one of the remaining signatures to process, as described above. Once all signatures have been analyzed, the process may pass from block 160 to block 162, and mole analysis program 44 may produce output to notify the user about all moles changes that have been detected.

Figure 6:
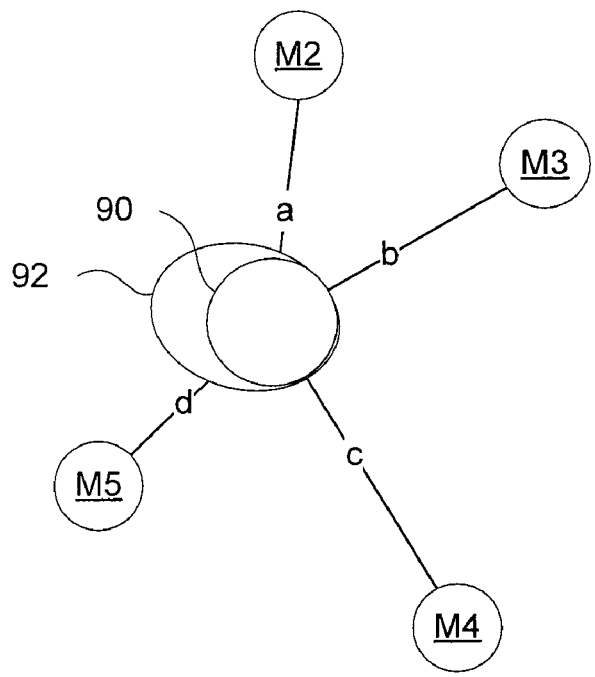
FIG. 6 is a schematic diagram that represents changes in a mole, as revealed according to an example embodiment of the present invention.

FIG. 6 is a schematic diagram that represents changes in a mole, as displayed or printed according to an example embodiment of the present invention. Mole analysis program 44 may generate output such as that depicted in FIG. 6 to notify the user about detected changes to the outline of mole M1. In particular, reference number 90 identifies the outline of mole M1 according to the baseline image (e.g., the image of FIG. 3), while reference number 92 identifies the outline according to the present image (e.g., the image of FIG. 5). Mole analysis program 44 may also generate output to notify the user about other kinds of changes, as indicated above. The process of FIG. 4 may then end, to start again upon receipt of the next digital image to be analyzed.

A mole analysis program according to the present disclosure may thus allow home users to monitor suspicious moles at home, or to monitor specific regions of the body with requiring full body coverage. The images also need not be captured from the same distance, perspective, or angle. Many people already own digital cameras and PCs or similar devices. With the software described above, home users may learn about changes in moles while avoiding much of the expense and inconvenience associated with conventional approaches to mole analysis.

In light of the principles and example embodiments described and illustrated herein, it will be recognized that the described embodiments can be modified in arrangement and detail without departing from such principles. Although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:

Using at least one processor to perform steps of:

generating a digital signature for a first mole, based at least in part on a digital image of first, second, and third moles;

accessing baseline data that contains baseline signatures for previously imaged moles; and determining whether the first mole matches a previously imaged mole, based at least in part on the digital signature for the first mole and at least one of the baseline signatures in the baseline data;

wherein the operation of generating a digital signature for a first mole comprises at least one operation from the group consisting of:
recording an angle entry for the digital signature, the angle entry representing an angle between (a) a first line to connect the first mole with the second mole in the digital image and (b) a second line to connect the first mole with the third mole in the digital image; and
recording a distance entry for the digital signature, the distance entry corresponding to a distance between the first mole and the second mole.

2. A method according to claim 1, wherein the operation of generating a digital signature for a first mole comprises:
using a ratio to generate the distance entry for the digital signature.

3. A method according to claim 1, wherein the operation of generating a digital signature for a first mole comprises:
recognizing the second and third moles as neighbors to the first mole;
computing the distances between the first mole and the neighboring moles; and
recording distance entries for the neighboring moles in the digital signature for the first mole.

4. A method according to claim 1, wherein the distance entry comprises:
a distance ratio defined as a/(min (a,b)), wherein "a" corresponds to the distance between the first mole and the second mole, and "b" corresponds to a distance between the first mole and the third mole.

5. A method according to claim 1, further comprising:
recording a sector ratio for the digital signature, the sector ratio defined as a/b, wherein "a" corresponds to the distance between the first mole and the second mole, and "b" corresponds to a distance between the first mole and the third mole.

6. A method according to claim 1, further comprising:
analyzing the digital image to determine whether the digital image contains two or more moles; and
in response to determining that the digital image contains two or more moles, automatically generating the digital signature for the first mole.

7. A method according to claim 1, wherein:
the at least one baseline signature in the baseline data pertains to a baseline image that was captured from one camera position;
the digital image was captured from a different camera position; and
the operation of determining whether the first mole matches a previously imaged mole comprises using the digital signature and the at least one baseline signature to determine whether the first mole matches a previously imaged mole, despite the different camera positions.

8. A method according to claim 7, wherein:
the difference in the camera position comprises a difference, relative to a body part being imaged, in one or more attributes from the group consisting of:
rotation of the camera;
distance of the camera; and
angle of the camera.

9. A method according to claim 1, further comprising:
in response to determining that the first mole matches a previously imaged mole, automatically determining whether the first mole has changed.

10. A method according to claim 1, further comprising:
in response to determining that the first mole matches a previously imaged mole, automatically determining whether the first mole has changed; and
in response to determining that the first mole has changed, automatically providing output to indicate that the first mole has changed.

11. A processing system comprising:
a processor;
a machine-accessible medium responsive to the processor; and
instructions in the machine accessible medium, wherein the instructions, when executed by the processing system, cause the processing system to perform operations comprising:
generating a digital signature for a first mole, based at least in part on a digital image of first, second, and third moles;
accessing baseline data that contains baseline signatures for previously imaged moles; and
determining whether the first mole matches a previously imaged mole, based at least in part on the digital signature for the first mole and at least one of the baseline signatures in the baseline data;
wherein the operation of generating a digital signature for a first mole comprises at least one operation from the group consisting of:
recording an angle entry for the digital signature, the angle entry representing an angle between (a) a first line to connect the first mole with the second mole in the digital image and (b) a second line to connect the first mole with the third mole in the digital image; and
recording a distance entry for the digital signature, the distance entry corresponding to a distance between the first mole and the second mole.

12. A processing system according to claim 11, wherein the instructions cause the processing system to perform operations comprising:
using a ratio to generate the distance entry for the digital signature.

13. A processing system according to claim 11, wherein the instructions cause the processing system to perform operations comprising:
recognizing the second and third moles as neighbors to the first mole;
computing the distances between the first mole and the neighboring moles; and
recording distance entries for the neighboring moles in the digital signature for the first mole.

14. A processing system according to claim 11, wherein:
the at least one baseline signature in the baseline data pertains to a baseline image that was captured from one camera position;
the digital image was captured from a different camera position; and
the operation of determining whether the first mole matches a previously imaged mole comprises using the digital signature and the at least one baseline signature to determine whether the first mole matches a previously imaged mole, despite the different camera positions.

15. A processing system according to claim 14, wherein:
the difference in the camera position comprises a difference, relative to a body part being imaged, in one or more attributes from the group consisting of:
rotation of the camera;
distance of the camera; and
angle of the camera.

16. A processing system according to claim 11, wherein the instructions cause the processing system to perform operations comprising:

in response to determining that the first mole matches a previously imaged mole, automatically determining whether the first mole has changed; and in response to determining that the first mole has changed, automatically providing output to indicate that the first mole has changed.

17. An apparatus comprising:

a machine accessible medium; and instructions in the machine accessible medium, wherein the instructions, when executed by a processing system, cause the processing system to perform operations comprising:

generating a digital signature for a first mole, based at least in part on a digital image of first, second, and third moles;

accessing baseline data that contains baseline signatures for previously imaged moles; and determining whether the first mole matches a previously imaged mole, based at least in part on the digital signature for the first mole and at least one of the baseline signatures in the baseline data;

wherein the operation of generating a digital signature for a first mole comprises at least one operation from the group consisting of:

recording an angle entry for the digital signature, the angle entry representing an angle between (a) a first line to connect the first mole with the second mole in the digital image and (b) a second line to connect the first mole with the third mole in the digital image; and recording a distance entry for the digital signature, the distance entry corresponding to a distance between the first mole and the second mole.

18. An apparatus according to claim 17, wherein the instructions cause the processing system to perform operations comprising:

using a ratio to generate the distance entry for the digital signature.

19. An apparatus according to claim 17, wherein the instructions cause the processing system to perform operations comprising:

recognizing the second and third moles as neighbors to the first mole;

computing the distances between the first mole and the neighboring moles; and recording distance entries for the neighboring moles in the digital signature for the first mole.

20. An apparatus according to claim 17, wherein:

the at least one baseline signature in the baseline data pertains to a baseline image that was captured from one camera position;

the digital image was captured from a different camera position; and the operation of determining whether the first mole matches a previously imaged mole comprises using the digital signature and the at least one baseline signature to determine whether the first mole matches a previously imaged mole, despite the different camera positions.

21. An apparatus according to claim 20, wherein:

the difference in the camera position comprises a difference, relative to a body part being imaged, in one or more attributes from the group consisting of:

rotation of the camera;

distance of the camera; and angle of the camera.

22. An apparatus according to claim 17, wherein the instructions cause the processing system to perform operations comprising:

in response to determining that the first mole matches a previously imaged mole, automatically determining whether the first mole has changed; and in response to determining that the first mole has changed, automatically providing output to indicate that the first mole has changed.

* * * * *